US011431620B2

(12) United States Patent
Kaliyamoorthy

(10) Patent No.: US 11,431,620 B2
(45) Date of Patent: Aug. 30, 2022

(54) CONTROL PACKET TRANSMISSION SYSTEM

(71) Applicant: Dell Products L.P., Round Rock, TX (US)

(72) Inventor: Karthi Kaliyamoorthy, Chennai (IN)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 16/666,223

(22) Filed: Oct. 28, 2019

(65) Prior Publication Data

US 2021/0126855 A1 Apr. 29, 2021

(51) Int. Cl.
*H04L 45/24* (2022.01)
*H04L 45/7453* (2022.01)
*H04L 49/25* (2022.01)

(52) U.S. Cl.
CPC ........ *H04L 45/245* (2013.01); *H04L 45/7453* (2013.01); *H04L 49/25* (2013.01)

(58) Field of Classification Search
None
See application file for complete search history.

(56) References Cited

U.S. PATENT DOCUMENTS

| | | | | |
|---|---|---|---|---|
| 7,757,276 B1 * | 7/2010 | Lear | ...................... | G06F 21/572 726/10 |
| 2008/0109568 A1 * | 5/2008 | Rengarajan | ........... | H04L 41/085 710/19 |
| 2013/0182581 A1 * | 7/2013 | Yeung | ................... | H04L 49/201 370/244 |
| 2013/0194914 A1 * | 8/2013 | Agarwal | ................. | H04L 47/10 370/225 |
| 2014/0317250 A1 * | 10/2014 | Saltsidis | ............. | H04L 41/0806 709/221 |
| 2015/0312088 A1 * | 10/2015 | Ramakrishnan | ........ | H04L 41/30 370/218 |
| 2018/0198888 A1 * | 7/2018 | King | ................... | H04L 41/0806 |
| 2019/0250929 A1 * | 8/2019 | Pasirstein | ............. | G06F 21/602 |

OTHER PUBLICATIONS

"Is it possible to securely combine multiple hashes without hashing them?", Stackexchange Website, Jun. 1, 2016 [retrieved on Jan. 1, 2022], Retrieved from the Internet: <URL: https://crypto.stackexchange.com/questions/35754/is-it-possible-to-securely-combine-multiple-hashes-without-hashing-them>. (Year: 2016).*

* cited by examiner

*Primary Examiner* — Kevin T Bates
*Assistant Examiner* — Dae Kim
(74) *Attorney, Agent, or Firm* — Joseph Mencher

(57) ABSTRACT

A control packet transmission system includes a first switch device that, during a first time period, generates and transmits first control packets to a second switch device. Furthermore, a third switch device is provided that, during the first time period, generates and transmits third control packets to the second switch device, and transmits a copy of those third control packets to the first switch device. The first switch then generates respective first hash values using each of the first and third control packets, and generate a first consolidated hash value using each of the respective first hash values. During a subsequent second time period, the first switch device may determine that control data exchanged during the first and second time periods is the same and, in response, transmit the first consolidated hash value to the second switch device in place of any control packets transmitted to the second switch device.

20 Claims, 13 Drawing Sheets

CONTROL PACKET TRANSMISSION SYSTEM

BACKGROUND

The present disclosure relates generally to information handling systems, and more particularly to transmitting control packets between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, sometimes exchange control data in control packets in order to provide for the proper operation of those switch devices. For example, aggregated switch devices may each be coupled to a Top Of Rack (TOR) switch device by multiple links that are aggregated into a Link Aggregation Group (LAG), as well as to a core switch device by multiple links that are aggregated into LAG, and may exchange control data in control packets via those links/LAGs with the TOR switch device and the core switch device. In a specific example of aggregated switch device/TOR switch device control data exchange, each of the aggregated switch devices may periodically transmit control data in control packets to the TOR switch device via each link in the LAG that is provided to that TOR switch device, while the TOR switch device may also periodically transmit control data in control packets to each of the aggregated switch devices via each link in the LAG that is provided between that TOR switch device and the aggregated switch devices. As aggregated switch devices scale to provide greater numbers of LAGs to their connected switch devices, the number of control packets transmitted can become substantial.

For example, next-generation aggregated switch devices may be capable of providing 512 LAGs to respective connected switch devices. As such, the number of control packets being transmitted between the aggregated switch devices and their connected switch devices can reach a level that may exceed the capacity of processor queues and/or buffers in the switch devices, which can lead to control packet being "dropped", and associated switch port/link "flaps" (i.e., where the port/link repeatedly becomes available and unavailable.) Furthermore, even when the processor queues and/or buffers are sufficient to handle the large number of control packets being exchanged, the relatively significant amount of processing required by the switch devices to process the control data/control packets utilizes processing resources in those switch devices that could be utilized for other tasks, while also utilizing relatively significant bandwidth between the switch devices.

To provide an example in which 512 LAGs are provided between the aggregated switch devices and respective TOR switch devices, with each LAG including pair of links (i.e., one to each of the aggregated switch devices), each time control data is exchanged between the aggregated switch devices and the TOR switch device, (512 LAGs * 2 links in each LAG=) 1024 control packets must be exchanged. In such a situation, 1024 control packets are generated and transmitted each time control data must be provided from the aggregated switch devices and the TOR switch devices, and 1024 control packets are generated and transmitted each time control data must be provided from the TOR switch device to the aggregated switch devices. As will be appreciated by one of skill in the art, such control data may be exchanged at a "normal" rate of once every 30 seconds in some systems, or at a "high" rate of once every second in other systems. Furthermore, the next-generation switch devices discussed above can support LAGs with up to 16 links each (e.g., 8 links to each aggregated switch device.) Thus, the number of control packets exchanged between aggregated switch device and their connected switch devices will become relatively large in some system configurations for next-generation aggregated switch devices.

Accordingly, it would be desirable to provide a control packet transmission system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a control packet transmission engine that is configured, during a first control data exchange time period, to: generate first control packets; transmit the first control packets to a first switch device; receive, from a second switch device, a copy of second control packets that were transmitted by the second switch device to the first switch device; generate respective first hash values using each of the first control packets and the second control packets; and generate a first consolidated hash value using each of the respective first hash values, and wherein the control packet transmission engine is configured, during a second control data exchange time period that is subsequent to the first control data exchange time period, to: determine that control data exchanged during the second control data exchange time period will be the same as control data exchanged during the first control data exchange time period and, in response, transmit the first consolidated hash value to the first switch device in place of any control packets transmitted to the first switch device by the control packet transmission engine and the second switch device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
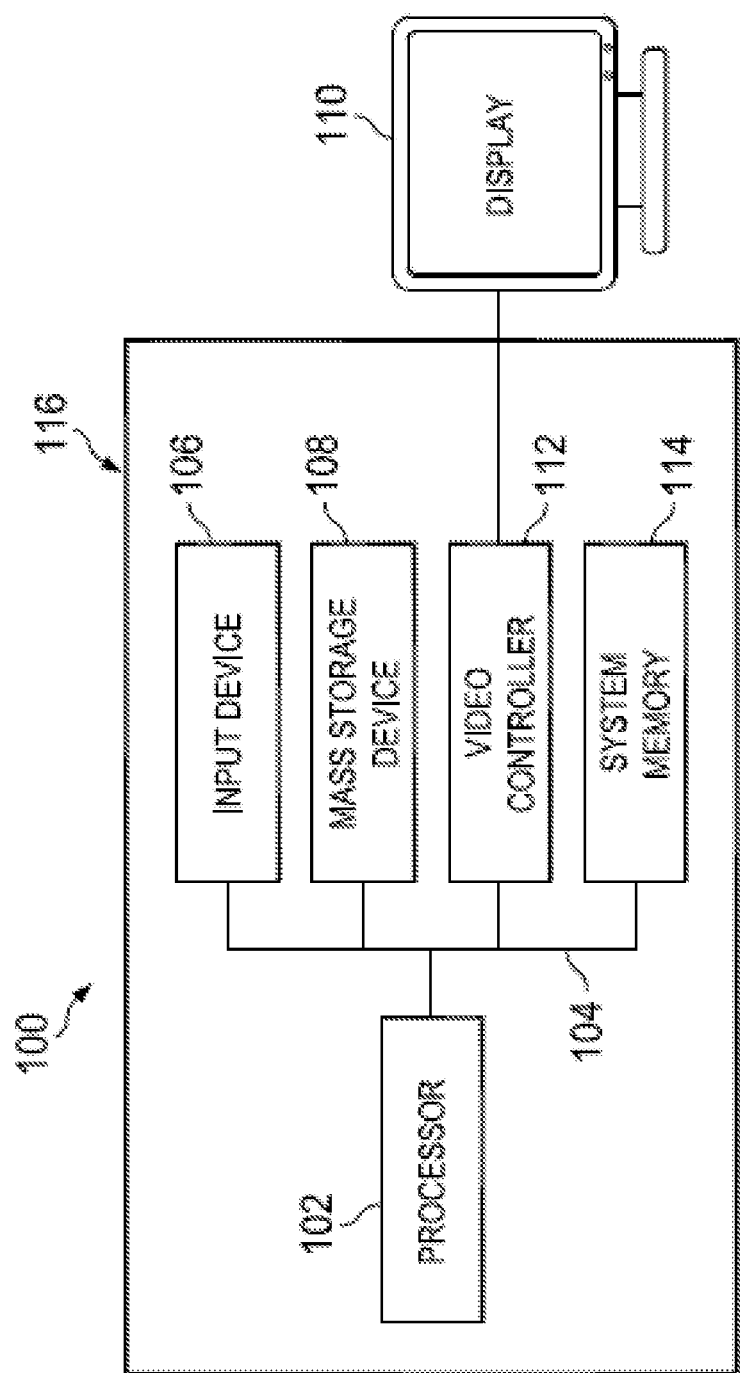
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
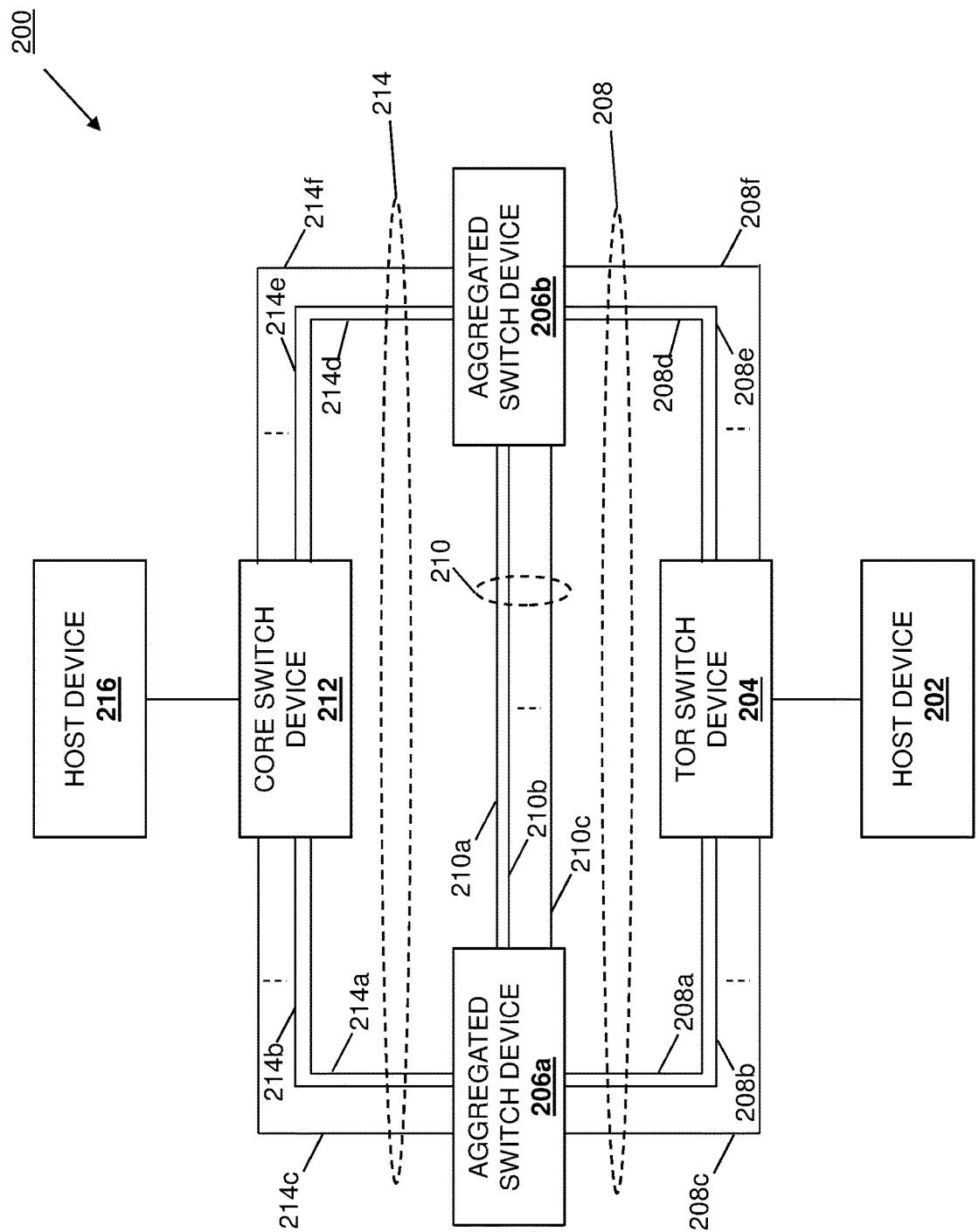
FIG. 2 is a schematic view illustrating an embodiment of a control packet transmission system.

Referring now to FIG. 2, an embodiment of a control packet transmission system 200 is illustrated. In the illustrated embodiment, the control packet transmission system 200 incudes a host device 202. In an embodiment, the host device 202 may be provided by the IHS 100 discussed above with reference to FIG. 1, and/or may include some or all of the components of the IHS 100, and in a specific example may be provided by a server device. However, while illustrated and discussed as a server device, one of skill in the art in possession of the present disclosure will recognize that host devices provided in the control packet transmission system 200 may include any devices that may be configured to operate similarly as the host device 202 discussed below. In the illustrated embodiment, the host device 202 is coupled to a Top Of Rack (TOR) switch device 204 that, in the illustrated example, may be provided in a rack with the host device 202. In an embodiment, the TOR switch device 204 may be provided by the IHS 100 discussed above with reference to FIG. 1, and/or may include some or all of the components of the IHS 100. However, while illustrated and discussed as a TOR switch device, one of skill in the art in possession of the present disclosure will recognize that switch devices provided in the control packet transmission system 200 may include any devices that may be configured to operate similarly as the TOR switch device 204 discussed below.

In the illustrated embodiment, the TOR switch device 204 is coupled to a pair of aggregated switch devices 206a and 206b via a Link Aggregation Group (LAG) 208 that include a plurality of links 208a, 208b, and up to 208c between the TOR switch device 204 and the aggregated switch device 206a (e.g., with each link provided between respective ports on the TOR switch device 204 and the aggregated switch device 206a), and a plurality of links 208d, 208e, and up to 208f between the TOR switch device 204 and the aggregated switch device 206b (e.g., each link provided between respective ports on the TOR switch device 204 and the aggregated switch device 206b). In an embodiment, either or both of the aggregated switch devices 206a and 206b may be provided by the IHS 100 discussed above with reference to FIG. 1, and/or may include some or all of the components of the IHS 100, and in a specific example may be provided by Virtual Link Trunking (VLT) peer devices, discussed in further detail below. However, while illustrated and discussed as a VLT peer devices, one of skill in the art in possession of the present disclosure will recognize that aggregated switch devices provided in the control packet transmission system 200 may include any devices that may be configured to operate similarly as the aggregated switch devices 206a and 206b discussed below. Furthermore, while a single LAG 208 is illustrated, as discussed above next-generation aggregated switch devices may be configured to support up to 512 LAGs to a connected switch device, and thus one of skill in the art in possession of the present disclosure will recognize that the LAG 208 may be one of many LAGs provided by the aggregated switch devices 206a and 206b.

In an embodiment, the aggregated switch devices 206a and 206b are coupled together via an Inter-Chassis Link (ICL) 210 that, in the illustrated example, is provided by a LAG that includes a plurality of links 210a, 210b, and up to 210c between the aggregated switch devices 206a and 206b (e.g., with each link provided between respective ports on the aggregated switch device 206a and the aggregated switch device 206b). In the illustrated embodiment, the aggregated switch devices 206a and 206b are coupled to a core switch device 212 via a Link Aggregation Group (LAG) 214 that include a plurality of links 214a, 214b, and up to 214c between the aggregated switch device 206a and the core switch device 212 (e.g., with each link provided between respective ports on the core switch device 212 and the aggregated switch device 206a), and a plurality of links 214d, 214e, and up to 214f between the core switch device 212 and the aggregated switch device 206b (e.g., each link provided between respective ports on the core switch device 212 and the aggregated switch device 206b). Similarly as discussed above, while a single LAG 214 is illustrated, next-generation aggregated switch devices may be configured to support up to 512 LAGs to a connected switch device, and thus one of skill in the art in possession of the present disclosure will recognize that the LAG 214 may be one of many LAGs provided by the aggregated switch devices 206a and 206b.

As discussed above, in specific examples, the aggregated switch devices 206a and 206b may be provided by switch devices utilizing the Virtual Link Trunking (VLT) protocol. As will be appreciated by one of skill in the art in possession of the present disclosure, the VLT protocol is a proprietary aggregation protocol available in switch devices provided by DELL® Inc. of Round Rock, Tex., United States, and operates to provide a redundant, load-balancing connection in a loop-free environment that eliminates the need to use the Spanning Tree Protocol (STP), as well as including other VLT functionality known in the art. As such, with reference to FIG. 2, the aggregated networking devices 206a and 206b may be provided by VLT peer devices that are coupled together via the ICL 210 provided by a VLT interconnect (VLTi), and may operate to provide a VLT domain. One of skill in the art in possession of the present disclosure will appreciate that, in some embodiments, the LAGs 208 and 214 between the aggregated networking devices 206a and 206b/VLT peer devices and each of the TOR switch device 204 and the core switch device 212, respectively, may be provided in VLT LAGs. However, while a specific aggregation protocol is described, one of skill in the art in possession of the present disclosure will recognize that other aggregation protocols may fall within the scope of the present disclosure as well.

In an embodiment, the core switch device 212 may be provided by the IHS 100 discussed above with reference to FIG. 1, and/or may include some or all of the components of the IHS 100. However, while illustrated and discussed as a core switch device, one of skill in the art in possession of the present disclosure will recognize that switch devices provided in the control packet transmission system 200 may include any devices that may be configured to operate similarly as the core switch device 212 discussed below. In the illustrated embodiment, the core switch device 212 is coupled to a host device 216. In an embodiment, the host device 216 may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or other computing devices that would be apparent to one of skill in the art in possession of the present disclosure. However, one of skill in the art in possession of the present disclosure will recognize that host devices provided in the control packet transmission system 200 may include any devices that may be configured to operate similarly as the host device 216 discussed below. While a specific control packet transmission system 200 has been illustrated and described, one of skill in the art in possession of the present disclosure will recognize that the control packet transmission system of the present disclosure may include a variety of components and component configurations while remaining within the scope of the present disclosure as well.

Figure 3:
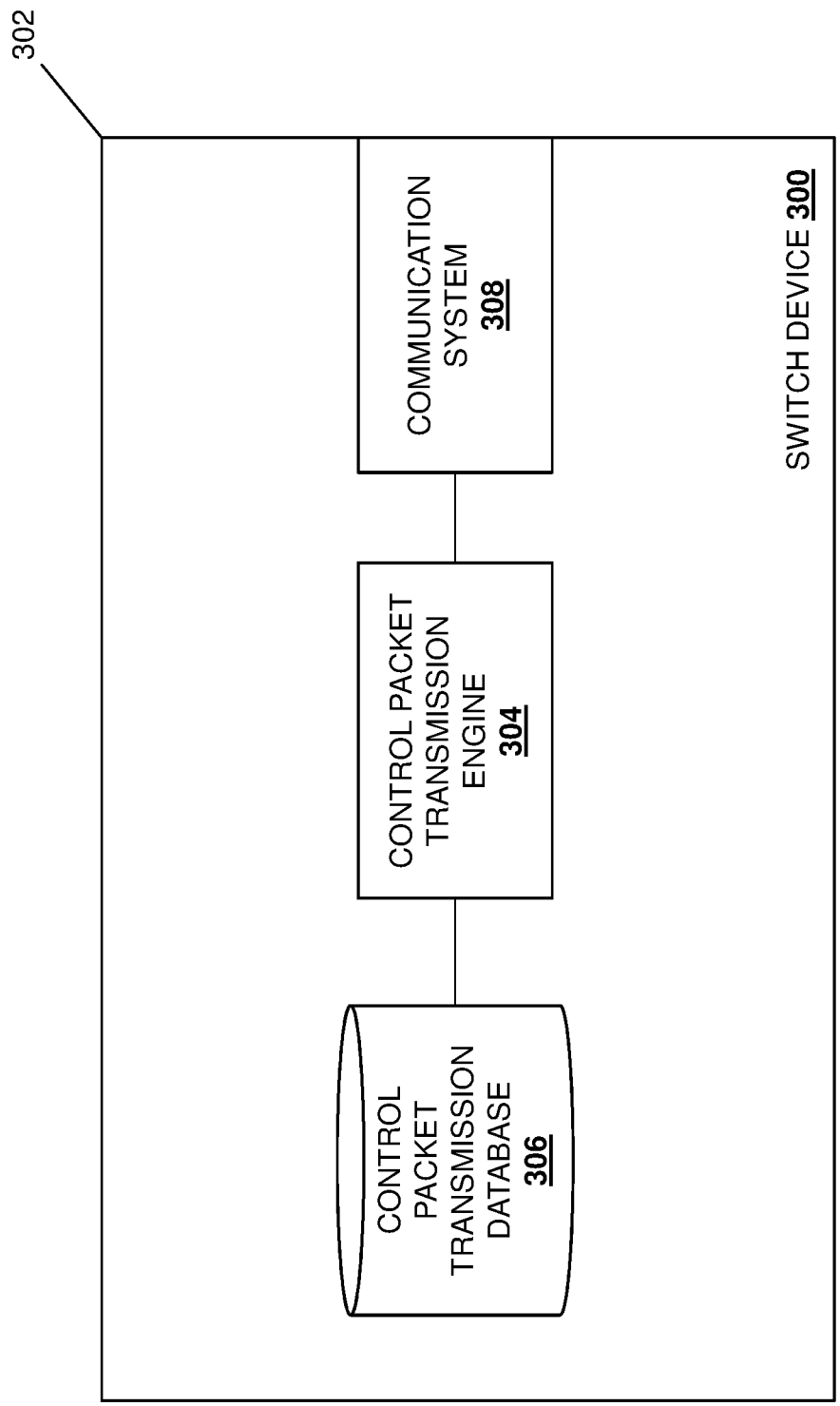
FIG. 3 is a schematic view illustrating an embodiment of a switch device that may be provided in the control packet transmission system of FIG. 2.

Referring now to FIG. 3, an embodiment of a switch device 300 is illustrated that may provide any or each of the TOR switch device 204, the aggregated switch devices 206a and 206b, and the core switch device 212 discussed above with reference to FIG. 2. As such, the switch device 300 may be provided by the IHS 100 discussed above with reference to FIG. 1 and/or may include some or all of the components of the IHS 100, and in specific examples may be provided by a TOR switch device, a VLT peer device, or a core switch device. Furthermore, while illustrated and discussed as being provided by particular switch devices, one of skill in the art in possession of the present disclosure will recognize that the functionality of the switch device 300 discussed below may be provided by other devices that are configured to operate similarly as the switch device 300 discussed below. In the illustrated embodiment, the switch device 300 includes a chassis 302 that houses the components of the switch device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a control packet transmission engine 304 that is configured to perform the functionality of the control packet transmission engines and/or switch devices discussed below.

The chassis 302 may also house a storage system (not illustrated, but which may include the storage 108 discussed above with reference to FIG. 1) that is coupled to the control packet transmission engine 304 (e.g., via a coupling between the storage system and the processing system) and that includes a control packet transmission database 306 that is configured to store any of the information utilized by the control packet transmission engine 304 discussed below. The chassis 302 may also house a communication system 308 that is coupled to the control packet transmission engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, one of skill in the art in possession of the present disclosure will appreciate that the communication system 308 may include any of the ports that provide any of the links between the switch devices in the control packet transmission system 200. While a specific switch device 300 has been illustrated, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
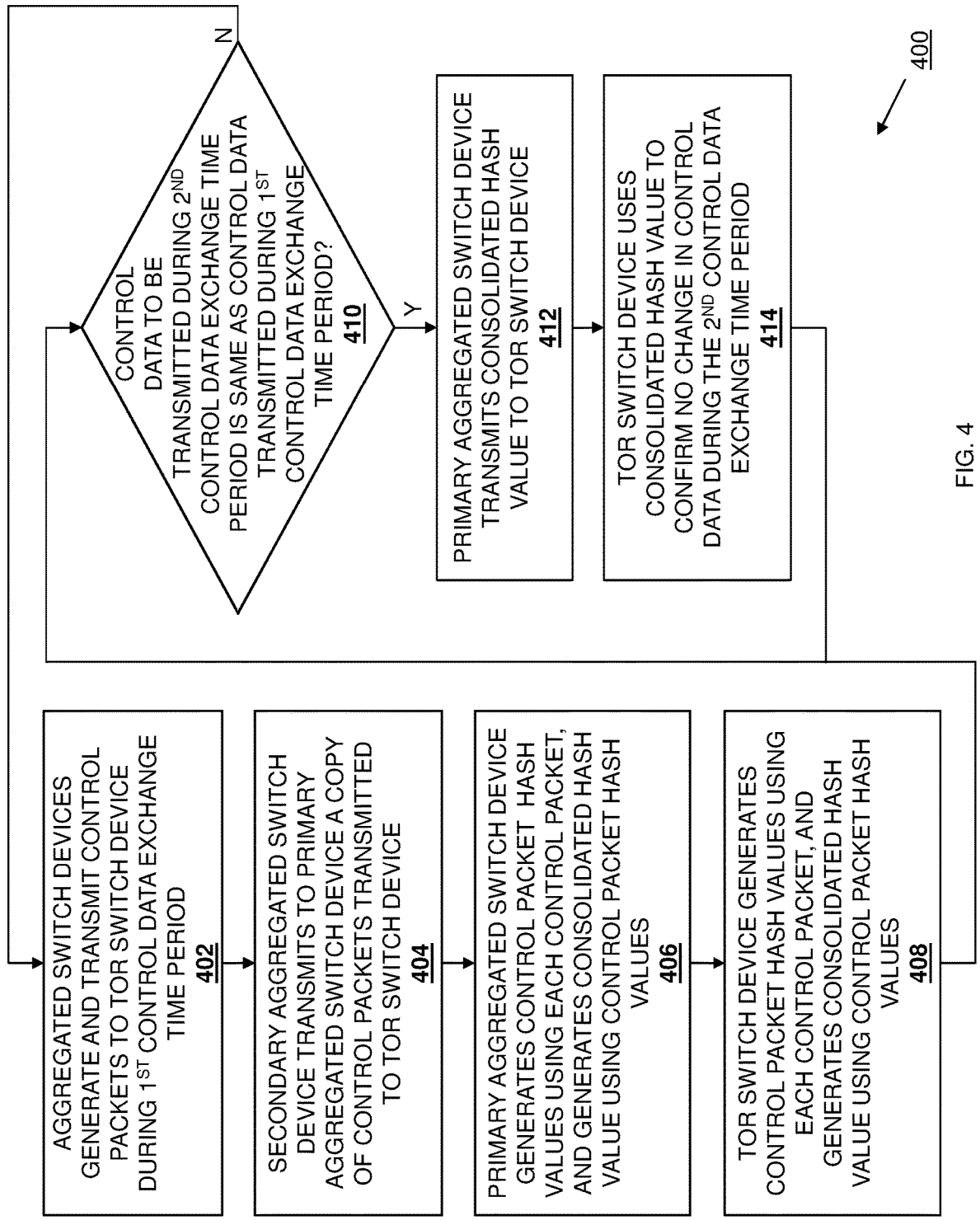
FIG. 4 is a flow chart illustrating an embodiment of a method for transmitting control packets.

Referring now to FIG. 4, an embodiment of a method 400 for transmitting control packets is illustrated. As discussed below, the systems and methods of the present disclosure provide for the generation of a consolidated hash value, using hash values generated for all of the control packets transmitted between aggregated switch devices and a connected switch device during any first control data exchange time period, by both a primary aggregated switch device and the connected switch device. Subsequently, when the aggregated switch devices or the connected switch device are scheduled to transmit control packets to the other during a second control data exchange time period, they may determine that the control data in those control packets is the same as that which was transmitted during the first control data exchange time period and, in response, may transmit the consolidated hash value in place of any control packets that are scheduled for transmission during that second control data exchange time period. Upon receiving the consolidated hash value during the second control data exchange time period, the primary aggregated switch device or the connected switch device may identify that the control data scheduled for transmission has not changed (e.g., based on receiving the consolidated hash value that was also previously generated by that device during the first control data exchange time period.) As such, control packet processing, buffer use, queue use, and/or transmission bandwidth use is reduced when duplicative control data is transmitted between the aggregated switch devices and the connected switch device.

In the examples below, the control packet transmission functionality of the present disclosure is described with regard to control packets transmitted between the aggregated switch devices 206a and 206b and the TOR switch device 204, but one of skill in the art in possession of the present disclosure will recognize that similarly functionality may be performed for control packets transmitted between the aggregated switch devices 206a and 206b and the core switch device 212 (i.e., the core switch device 212 may be configured to operate similarly as the TOR switch device 204 discussed below.) As such, the systems and methods of the present disclosure may operate to reduce control packet processing, buffer use, queue use, and/or transmission bandwidth use when duplicative control data is transmitted between the aggregated switch devices 206a and 206b and either of the TOR switch device 204 and the core switch device 212. Furthermore, while the control packet transmission functionality is only illustrated and described as being performed for a single LAG (the LAG 208 in the examples below), one of skill in the art in possession of the present disclosure will appreciate that similar control packet transmission functionality may be performed on each LAG provided by the aggregated switch devices 206a and 206b (e.g., 512 LAGs available via next generation aggregated switch devices discussed above), thus providing the relatively substantial control packet processing, buffer use, queue use, and/or transmission bandwidth use efficiencies described herein.

In an embodiment, during or prior to the method 400, the aggregated switch devices 206 and 206b and the TOR switch device 204 may operate to communicate to confirm that each supports the control packet transmission functionality of the present disclosure. For example, the aggregated switch devices 206a and 206b may perform "handshake" operations by exchanging communications and negotiating to verify support of the control packet transmission functionality of the present disclosure, and each of the aggregated switch devices 206a and 206b may perform "handshake" operations by exchanging communications and negotiating to support of the control packet transmission functionality of the present disclosure. In the event any of the aggregated switch devices 206 and 206b and the TOR switch device 204 do not support the control packet transmission functionality of the present disclosure, the aggregated switch devices 206 and 206b and the TOR switch device 204 may subsequently operate using conventional control packet transmission techniques. In some examples, the control packet transmission functionality of the present disclosure may be enabled in the aggregated switch devices 206 and 206b and the TOR switch device 204 by default, or may be enabled/disabled in the aggregated switch devices 206 and 206b and the TOR switch device 204 via, for example, a Command Link Interface (CLI) utilized by a user or administrator of the aggregated switch devices 206 and 206b and the TOR switch device 204.

In a specific example in which the aggregated switch devices 206a and 206b are VLT peer devices, the "handshake" operations discussed above may be performed following convergence associated with the aggregated switch devices 206 and 206b and the TOR switch device 204 (e.g., as the control packets provided by LACP PDUs will vary until the LACP converges.) In "handshake" operations between the aggregated switch devices 206a/206b provided by VLT peer devices, a VLT Redis-database may be enhanced to allow for the negotiations described herein, while "handshake" operations between each of the aggregated switch devices 206a/206b provided by VLT peer devices and the TOR switch device 204 may be performed via control packets (e.g., Link Aggregation Control Protocol (LACP) Protocol Data Units (PDUs)) using, for example, reserved bits (e.g., a feature negotiation bit set) to allow for the negotiations discussed above.

In a specific example, the aggregated switch device 206a may act as a primary aggregated switch device provided by a primary VLT peer device, and the aggregated switch device 206b may act as a secondary aggregated switch device provided by a secondary VLT peer device, with the primary VLT peer device and secondary VLT peer device performing "handshake" operation negotiations by the primary VLT peer device transmitting a feature negotiation bit set to the secondary VLT peer device, the secondary VLT peer device replying with a feature negotiation bit set and an acknowledgement to the primary VLT peer device, and the primary VLT peer device responding with a feature negotiation acknowledgement to the secondary VLT peer device. As will be appreciated by one of skill in the art in possession of the present disclosure, the "handshake" operation negotiations may identify a hash operation type (e.g., a Secure Hash Algorithm (SHA)-256 hash operation type), as well as any other information that would be apparent to one of skill in the art in possession of the present disclosure. However, while specific "handshake" operations are described above, one of skill in the art in possession of the present disclosure will recognize that the aggregated switch devices 206 and 206b and the TOR switch device 204 may operate to confirm that each supports the control packet transmission functionality of the present disclosure in a variety of manners that will fall within its scope as well.

Figure 5A:
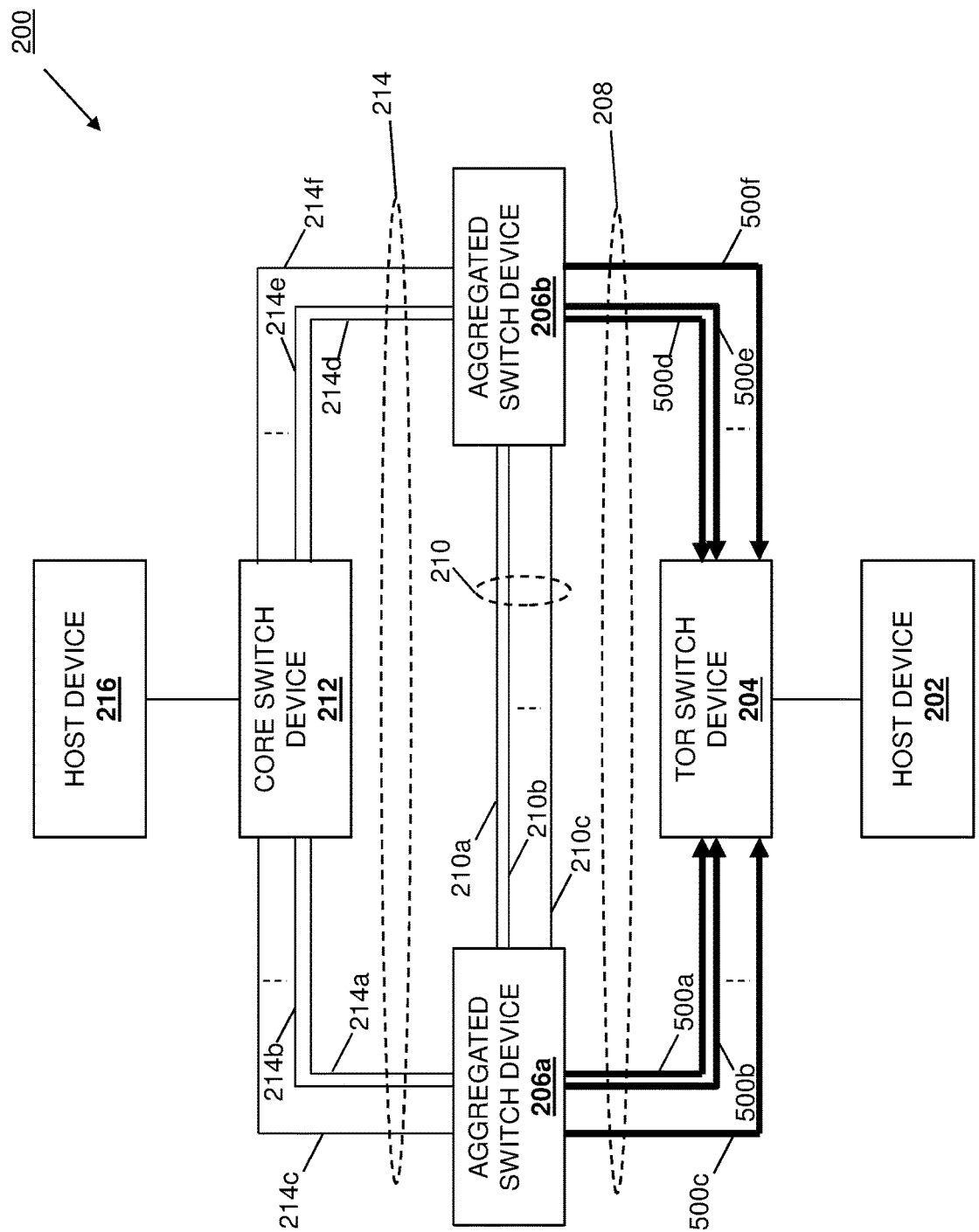
FIG. 5A is a schematic view illustrating an embodiment of the control packet transmission system of FIG. 2 operating during the method of FIG. 4.

The method 400 begins at block 402 where aggregated switch devices generate and transmit control packets to a TOR switch device during a first control data exchange time period. As illustrated in FIG. 5A, in an embodiment of block 402, the control packet transmission engine 304 in the aggregated switch device 206a/300 may operate to generate and transmit control data in control packets 500a, 500b, and up to 500c via its communication system 308, through each of the links 208a, 208b, and up to 208c, respectively, in the LAG 208, and to the TOR switch device 204. Similarly, as also illustrated in FIG. 5A, in an embodiment of block 402, the control packet transmission engine 304 in the aggregated switch device 206b/300 may operate to generate and transmit control data in control packets 500d, 500e, and up to 500f via its communication system 308, through each of the links 208d, 208e, and up to 208f, respectively, in the LAG 208, and to the TOR switch device 204. In an embodiment, the control packets 500a-500f may be provided by LACP PDUs, although one of skill in the art in possession of the present disclosure will recognize that control data transmitted utilizing other control packets may benefit from the teachings of the present disclosure and thus will fall within its scope as well.

Figure 5B:
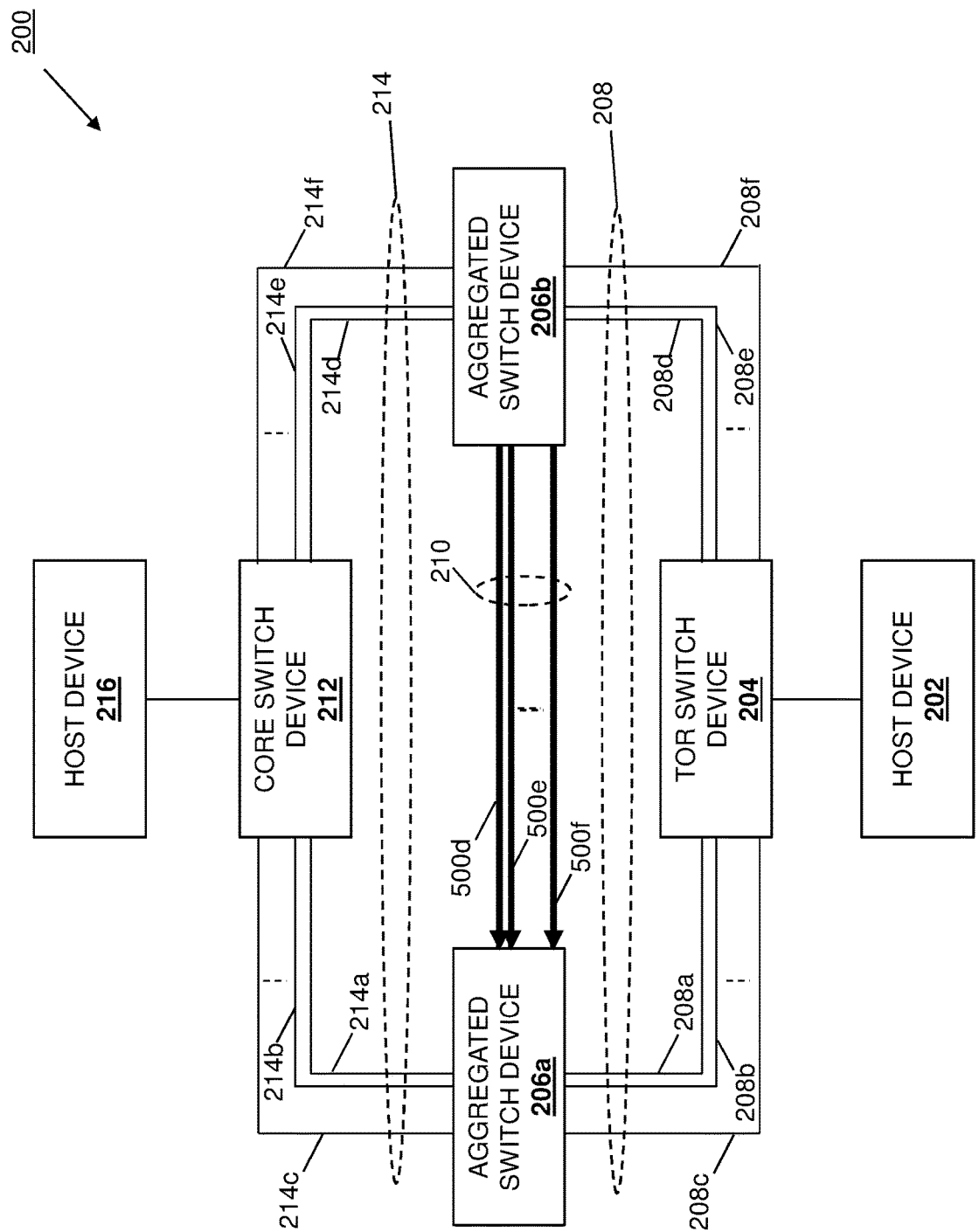
FIG. 5B is a schematic view illustrating an embodiment of the control packet transmission system of FIG. 2 operating during the method of FIG. 4.

The method 400 then proceeds to block 404 where a secondary aggregated switch device transmits to a primary aggregated switch device a copy of control packets sent to the TOR switch device. As discussed above, in some embodiments, the aggregated switch devices 206a and 206b may operate to elect one as a primary aggregated switch device, and the other as a secondary aggregated switch device. One of skill in the art in possession of the present disclosure will appreciated that the aggregated switch device 206a operates as the primary aggregated switch device in the examples below, while the aggregated switch device 206b acts as the secondary aggregated switch device in the examples below. However, one of skill in the art in possession of the present disclosure will also recognize that primary/secondary designations may switch such that the functionality discussed below as being performed by each of the aggregated switch device 206a and 206b is performed by the other. With reference to FIG. 5B, in an embodiment of block 404, the control packet transmission engine 304 in the aggregated switch device 206b/300 operating as the secondary aggregated switch device may operate to transmit copies of the control data in the control packets 500d, 500e, and up to 500f via the ICL 210 to the aggregated switch device 206a. As such, the copies of the control data in the control packets 500d, 500e, and up to 500f transmitted via the ICL 210 to the aggregated switch device 206a may be provided by LACP PDU's. Furthermore, while illustrated and described as being performed sequentially during the first control data exchange time period, in some embodiments the control packet transmission engine 304 in the aggregated switch device 206b/300 may operate to perform blocks 402 and 404 substantially simultaneously during the first control data exchange time period to transmit the control packets 500d, 500e, and up to 500f to both the TOR switch device and the aggregated switch device 206a at substantially the same time, or many perform block 404 before block 402 during the first control data exchange time period, while remaining within the scope of the present disclosure as well.

The method 400 then proceeds to block 406 where the primary aggregated switch device generates control packet hash values using each control packet, and generates a consolidated hash value using the control packet hash values. As will be appreciated by one of skill in the art in possession of the present disclosure, control data/control packets exchanged in the method 400 during the first control data exchange time period is "new" control data/control packets that either has not been previously transmitted by the aggregated switch devices 206a and 206b to the TOR switch device 204, or that includes at least one modification relative to the control data/control packets that was previously transmitted by the aggregated switch devices 206a and 206b to the TOR switch device 204. As such, in an embodiment of block 406, the control packet transmission engine 304 in the aggregated switch device 206a/300 operating as the primary aggregated switch device may operate to generate respective hash values for each of the control packets 500a-500f transmitted to the TOR switch device 204 during the first control data exchange time period by performing a respective hashing operation (e.g., a SHA-256 hashing operation in the example above) on each of the control packets 500a-500f (e.g., the control data in each of those control packets) to generate respective hash values that it may store in its control packet transmission database 306.

The control packet transmission engine 304 in the aggregated switch device 206a/300 operating as the primary aggregated switch device may then generate a consolidated hash value for each of the control packets 500a-500f transmitted to the TOR switch device 204 during the first control data exchange time period by performing a hashing operation (e.g., a SHA-256 hashing operation in the example above) on each of the respective hash values generated for those control packets 500a-500f, and may then store that consolidated hash value in its control data transmission database 306. However, while a specific example of generating a consolidated hash value has been described, one of skill in the art in possession of the present disclosure will recognize that the consolidated hash values of the present disclosure may be generated in a variety of manners that will fall within the scope of the present disclosure as well.

Figure 5C:
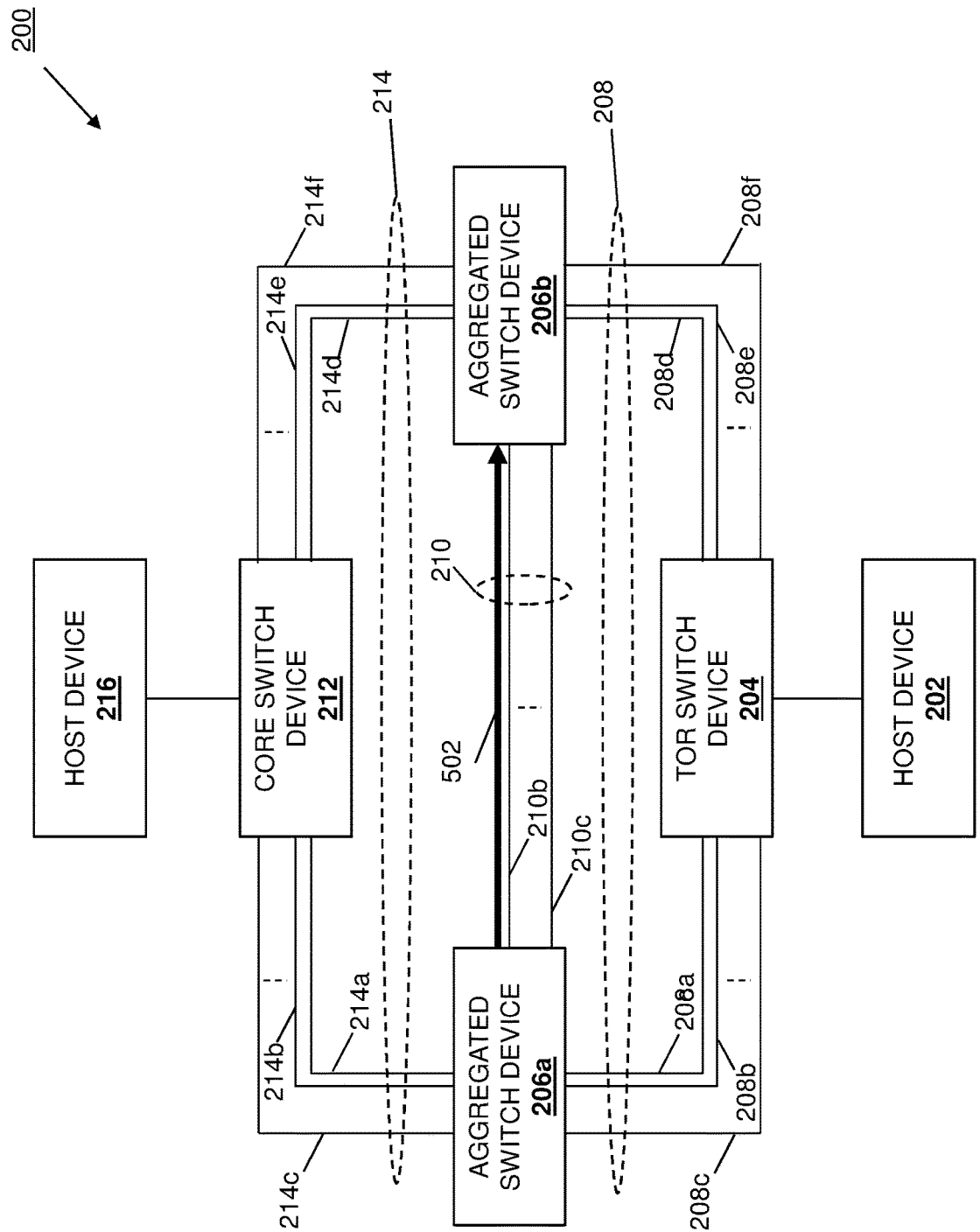
FIG. 5C is a schematic view illustrating an embodiment of the control packet transmission system of FIG. 2 operating during the method of FIG. 4.

With reference to the embodiment illustrated in FIG. 5C, in some examples the control packet transmission engine 304 in the aggregated switch device 206a/300 may transmit a consolidated hash packet 502 generated at block 406 via its communication system 308, through the ICL 210, and to the aggregated switch device 206b. As such, the control packet transmission engine 304 in the aggregated switch device 206b/300 may receive the consolidated hash packet 502 generated at block 406 by the aggregated switch device 206a via its communication system 308, and store information in that consolidated hash packet 502 in its control transmission database 306. While not discussed in detail below, one of skill in the art in possession of the present disclosure will appreciate that the aggregated switch device 206b operating as the secondary aggregated switch device may switch to operating as the primary aggregated switch device (e.g., in the event of the unavailability of the aggregated switch device 206a), and thus may store the information received in the consolidated hash packet 502 in the event it must later perform the operations of the primary aggregated switch device.

In a specific example in which the aggregated networking devices 206a and 206b are VLT peer devices, consolidated hash packets generated and transmitted according to the present disclosure may include the following packet format:

| VENDOR SPECIFIC HASH TYPE | OPERATION | CONSOLIDATED HASH VALUE |
|---|---|---|
| HASHING ALGORITHM IDENTIFIER | VLT LAG INSTANCE IDENTIFIER | CONSOLIDATED HASH VALUE |

As such, consolidated hash packets generated and transmitted according to the present disclosure may include a vendor specific hash type column that stores an hashing algorithm identifier that identifies a hashing algorithm utilized to generate the consolidated hash packets of the present disclosure, an operation column that stores a VLT LAG instance identifier that identifies the LAG between the VLT peer devices and their connected switch device upon which the control packets that were used to generate the consolidated hash value are transmitted, and a consolidated hash value column that stores the consolidated hash value that was generated. However, while a specific example is provided, one of skill in the art in possession of the present disclosure will recognize that the consolidated hash values of the present disclosure may be transmitted in a variety of manners that will fall within the scope of the present disclosure as well.

The method 400 then proceeds to block 408 where the TOR switch device generates the control packet hash values using each control packet, and generates the consolidated hash value using the control packet hash values. As discussed above, control data/control packets exchanged in the method 400 during the first control data exchange time period is "new" control data/control packets that either has not been previously transmitted by the aggregated switch devices 206a and 206b to the TOR switch device 204, or that includes at least one modification relative to the control data/control packets that was previously transmitted by the aggregated switch devices 206a and 206b to the TOR switch device 204. As such, in an embodiment of block 408, the control packet transmission engine 304 in the TOR switch device 204/300 may operate to generate respective hash values for each of the control packets 500a-500f transmitted to the TOR switch device 204 during the first control data exchange time period by performing a respective hashing operation (e.g., a SHA-256 hashing operation in the example above) on each of the control packets 500a-500f (e.g., the control data in each of those control packets) to generate respective hash values that it may store in its control packet transmission database 306.

The control packet transmission engine 304 in the TOR switch device 204 may then generate a consolidated hash value for each of the control packets 500a-500f received from the aggregated switch devices 206a and 206b during the first control data exchange time period by performing a hashing operation (e.g., a SHA-256 hashing operation in the example above) on each of the respective hash values generated for those control packets 500a-500f, and may then store that consolidated hash value in its control data transmission database 306. However, while a specific example of generating a consolidated hash value has been described, one of skill in the art in possession of the present disclosure will recognize that the consolidated hash values of the present disclosure may be generated in a variety of manners that will fall within the scope of the present disclosure as well. As will be appreciated by one of skill in the art in possession of the present disclosure, the TOR switch device 204 and the aggregated switch device 206a operating as the primary aggregated switch device will generate the same consolidated hash value at blocks 406 and 408, as each is performing the same hashing operation (e.g., the SHA-256 hashing operating in the examples above) on the same control data/control packets 500a-500e.

The method 400 then proceeds to decision block 410 where it is determined whether the control data to-be transmitted during a second control data exchange time period is the same as control data that was transmitted during the first control data exchange time period. In an embodiment, at decision block 410, the control packet transmission engine 304 in the aggregated switch device 206a operating as the primary aggregated switch device may operate to determine whether control data that is scheduled to be exchanged during a second control data exchange time period (that is subsequent to the first control data exchanged time period) is the same as the control data that was exchanged during the first control data exchange time period. In one example, the control packet transmission engines 304 in the aggregated switch devices 206a and 206b (e.g., operating as VLT peer devices) may have visibility of any modifications to itself and the other aggregated switch device (e.g., via communications from that other aggregated switch device, via access to that other aggregated switch device, etc.) that would result in the transmission of control data/control packets during the second control data exchange time period that is the same as the control data/control packets 500a-500e that were previously transmitted during the first control data exchange time period. As such, in some embodiments of decision block 410, the control packet transmission engine 304 in the aggregated switch device 206a may determine whether any modifications have occurred to the aggregated switch device 206a and/or the aggregated switch device 206b that would result in the transmission of control data/control packets during the second control data exchange time period that is the same as the control data/control packets 500a-500e that were previously transmitted during the first control data exchange time period.

While a particular technique for determining whether control data to-be transmitted during a second control data exchange time period is the same as control data that was transmitted during a first control data exchange time period has been described, one of skill in the art in possession of the present disclosure will appreciate that other techniques may be utilized that will fall within the scope of the present disclosure as well. For example, the control packet transmission engine 304 in the aggregated switch device 206a may operate at decision block 410 to generate a consolidated hash value using the control packets scheduled to be transmitted to the TOR switch device 204 during the second control data exchange time period (e.g., control packets it is scheduled to transmit to the TOR switch device 204, and control packets received from the aggregated switch device 206b that the aggregated switch device 206b is scheduled to transmit to the TOR switch device 204), and determine whether that consolidated hash value matches the consolidated hash value generated at block 406. However, one of skill in the art in possession of the present disclosure will appreciate that such techniques may utilize additional bandwidth on the ICL 210 (e.g., used by the aggregated switch device 206b operating as the secondary aggregated switch device to transmit control packets that the aggregated switch device 206b is scheduled to transmit to the TOR switch device 204 during the second control data exchange time period), and may be avoided if ICL bandwidth is an issue.

If, at decision block 410, it is determined that the control data to-be transmitted during the second control data exchange time period is not the same as control data that was transmitted during the first control data exchange time period, the method 400 returns to block 402, with the first control data exchange time period resetting. In an embodiment, at block 410, the control packet transmission engine 304 in the aggregated switch device 206a may operate at decision block 410 to determine that the control data/control packets scheduled for transmission during the second control data exchange time period is not the same as the control data/control packets 500a-500e that were transmitted during the first control data exchange time period and, in response, the method 400 may return to the block 402 and the first control data exchange time period may be reset such that the control data/control packets that are not the same as the control data/control packets 500a-500e that were transmitted during the first control data exchange time period in the above iteration of the method 400 will be considered to be generated and transmitted during a "new" first control data exchange time period in the subsequent iteration of the method 400. As such, each time control data to-be transmitted during a second control data exchange time period is not the same as control data that was transmitted during a first control data exchange time period, the method 400 may loop back through blocks 402-408 to operate as discussed above such that the aggregated switch device 206a and the TOR switch device generate a "new" consolidated hash value for that control data/those control packets.

Figure 5D:
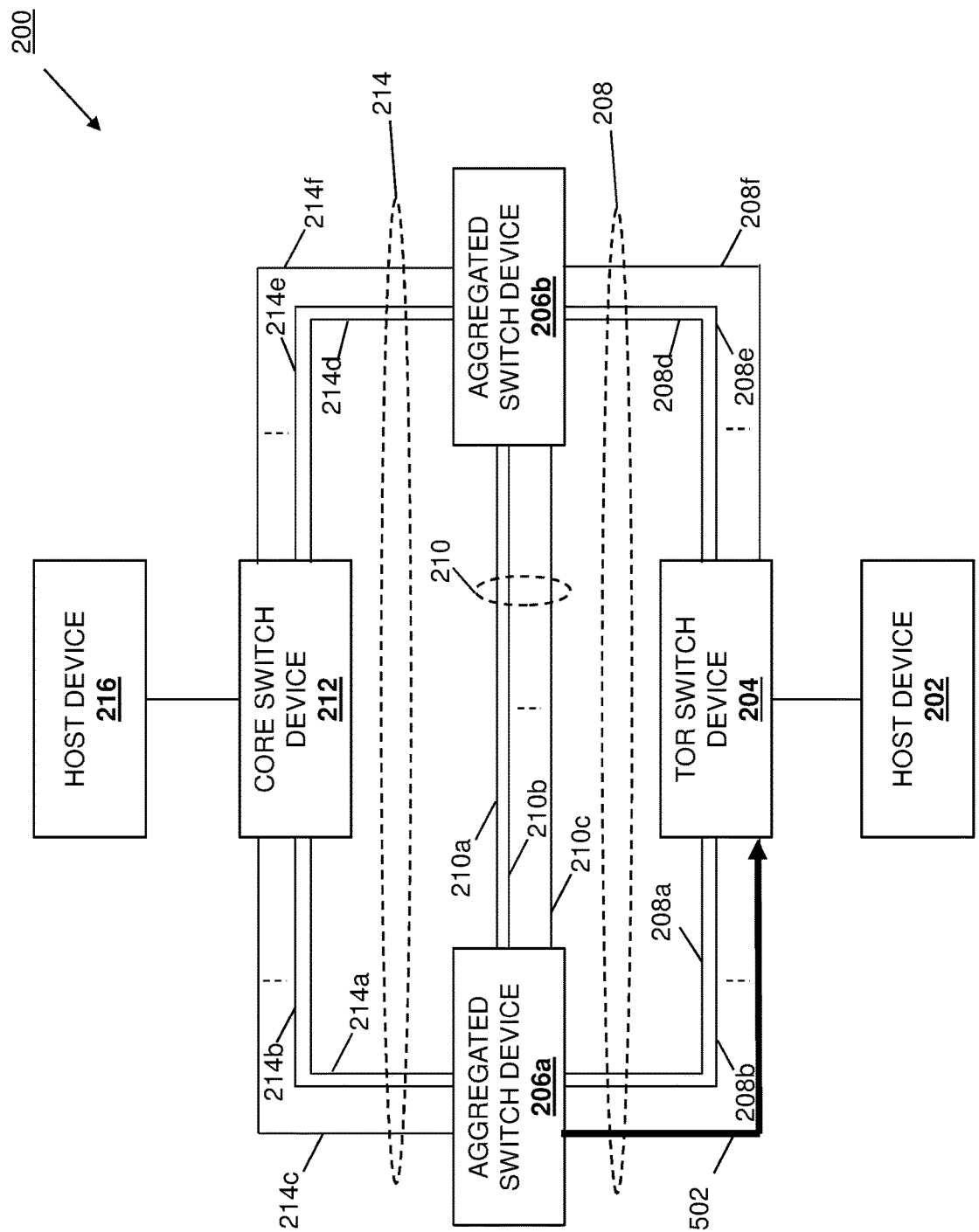
FIG. 5D is a schematic view illustrating an embodiment of the control packet transmission system of FIG. 2 operating during the method of FIG. 4.

If at decision block 410, it is determined that control data to-be transmitted during the second control data exchange time period is the same as control data that was transmitted during the first control data exchange time period, the method 400 proceeds to block 412 where the primary aggregated switch device transmits the consolidated hash value to the TOR switch device. In an embodiment, at block 412, the control packet transmission engine 304 in the aggregated switch device 206a may operate at decision block 410 to determine that the control data/control packets scheduled for transmission during the second control data exchange time period is the same as the control data/control packets 500a-500e that were transmitted during the first control data exchange time period and, in response, may operate to transmit the consolidated hash value that it generated at block 406 to the TOR switch device 204. For example, with reference to FIG. 5D, the control packet transmission engine 304 in the aggregated switch device 206a is illustrated as transmitting the consolidated hash packet 502 including the consolidated hash value it generated at block 406 via its communication system 308 and through the link 208a to the TOR switch device 204. As will be appreciated by one of skill in the art in possession of the present disclosure, the transmission of the consolidated hash packet 502 from the aggregated switch device 206a to the TOR switch device 204 via the single link 208a is performed in place of the generation and transmission of the control packets that were scheduled for transmission during the second control data exchange time period, thus saving processing, buffer, and queue resources in the aggregated switch devices 206a and 206b that would have been necessary to generate and transmit those control packets, as well as bandwidth resources between the aggregated switch devices 206a and 206b and the TOR switch device 204 (e.g., on the links 208b and up to 208c, 208d, 208e, and up to 208f) that would have been necessary to transmit those control packets.

The method 400 then proceeds to block 414 where the TOR switch device uses the consolidated hash value to confirm no changes occurred with control data during the second control data exchange time period. In an embodiment, at block 414, the control packet transmission engine 304 in the TOR switch device 204/300 may receive the consolidated hash packet 502 transmitted by the aggregated switch device 206a at block 412, and may determine that no changes in control data have occurred during the second control data exchange time period due to the consolidated hash value received from the aggregated switch device 206a at block 414 being the same as the consolidated hash value it calculated at block 408. The method 400 then returns to decision block 410, with the second control data exchange time period becoming the first control data exchange time period. As such, as long as the control data being exchanged in a subsequent control data exchange time period does not change, the method 400 may operate to loop through blocks 410-414 such that the aggregated switch device 206a determines that lack of change, the aggregated switch device 206a transmits the consolidated hash value to the TOR switch device 204, and the TOR switch device uses the consolidated hash value to confirm that no change has occurred during that subsequent control data exchange time period.

Figure 6:
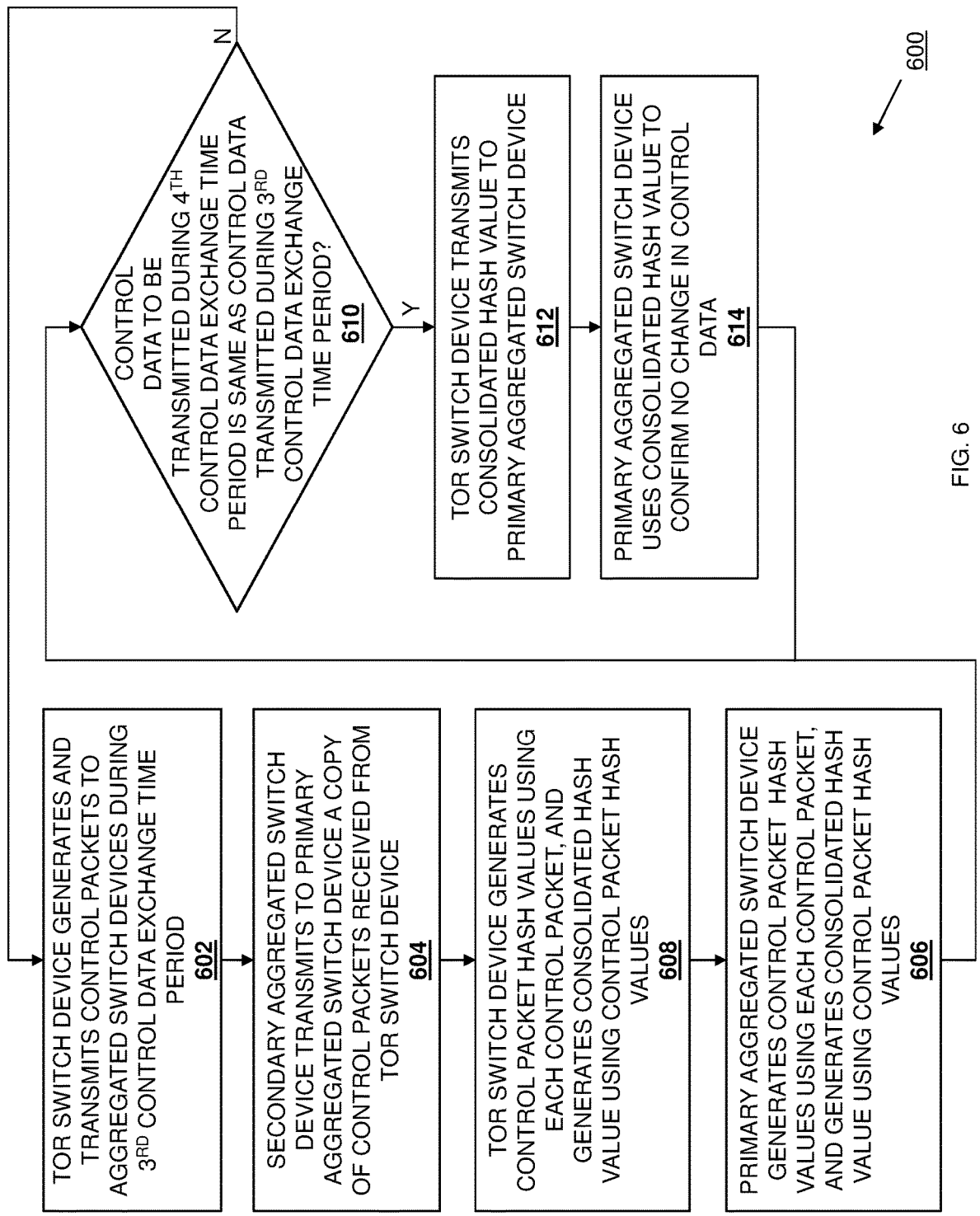
FIG. 6 is a flow chart illustrating an embodiment of a method for transmitting control packets.
Figure 7A:
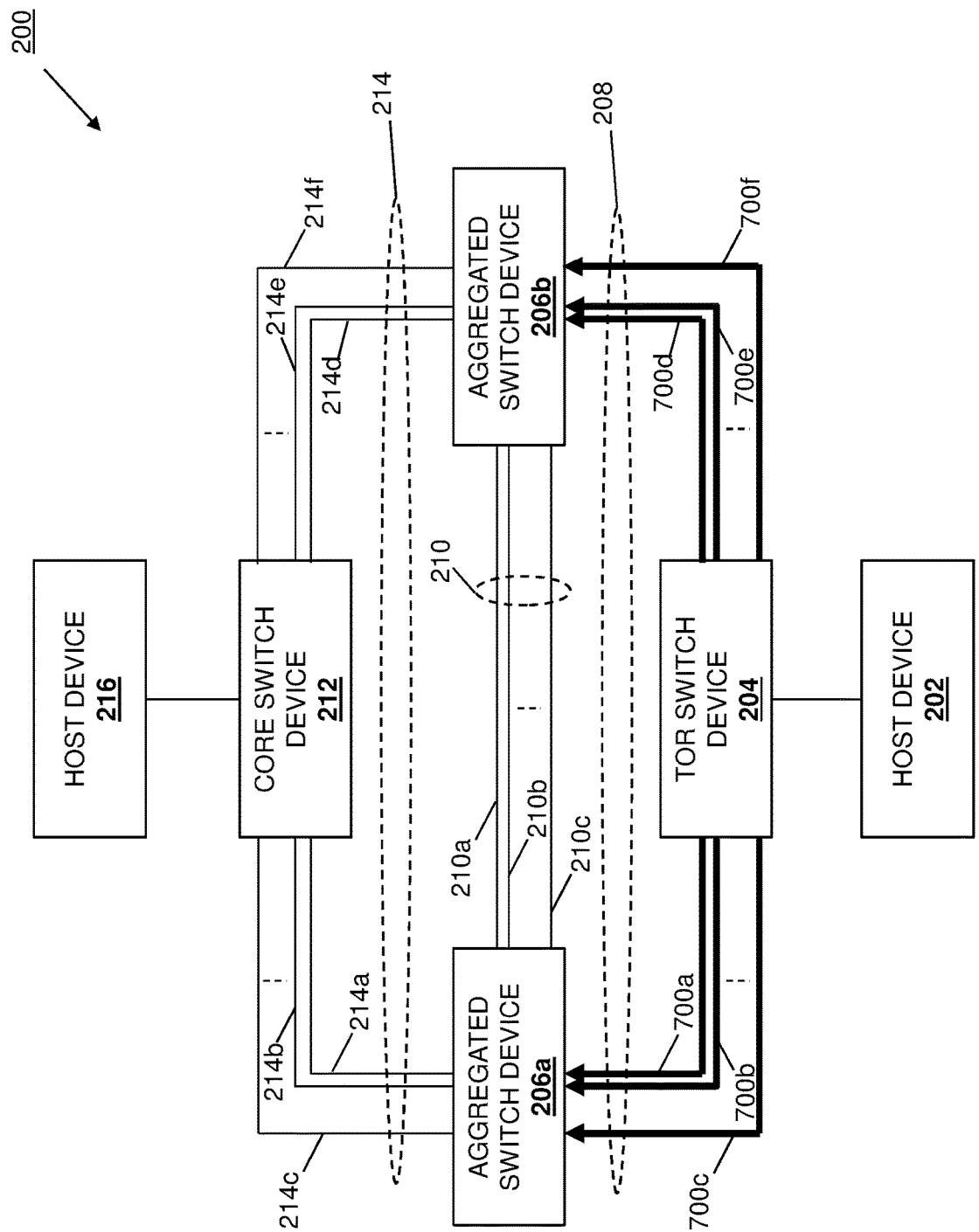
FIG. 7A is a schematic view illustrating an embodiment of the control packet transmission system of FIG. 2 operating during the method of FIG. 4.

Referring now to FIG. 6, an embodiment of a method 600 for transmitting control packets is illustrated. The method 600 begins at block 602 where the TOR switch device generates and transmits control packets to the aggregated switch devices during a third control data exchange time period. In a specific example, the third control data exchange time period may be subsequent to the first control data exchange time period discussed above with respect to the method 400, as it may provide control data/control packets in response to the control data/control packets received during the first control data exchange time period. However, one of skill in the art in possession of the present disclosure will recognize that other control data exchange time periods will fall within the scope of the present disclosure as well. As illustrated in FIG. 7A, in an embodiment of block 602, the control packet transmission engine 304 in the TOR switch device 204/300 may operate to generate and transmit control data in control packets 700a, 700b, and up to 700c via its communication system 308, through each of the links 208a, 208b, and up to 208c, respectively, in the LAG 208, and to the aggregated switch device 206a. Similarly, as also illustrated in FIG. 7A, in an embodiment of block 602, the control packet transmission engine 304 in the TOR switch device 204/300 may operate to generate and transmit control data in control packets 700d, 700e, and up to 700f via its communication system 308, through each of the links 208d, 208e, and up to 208f, respectively, in the LAG 208, and to the aggregated switch device 206b. In an embodiment, the control packets 700a-700f may be provided by LACP PDUs, although one of skill in the art in possession of the present disclosure will recognize that control data transmitted utilizing other control packets may benefit from the teachings of the present disclosure and thus will fall within its scope as well.

Figure 7B:
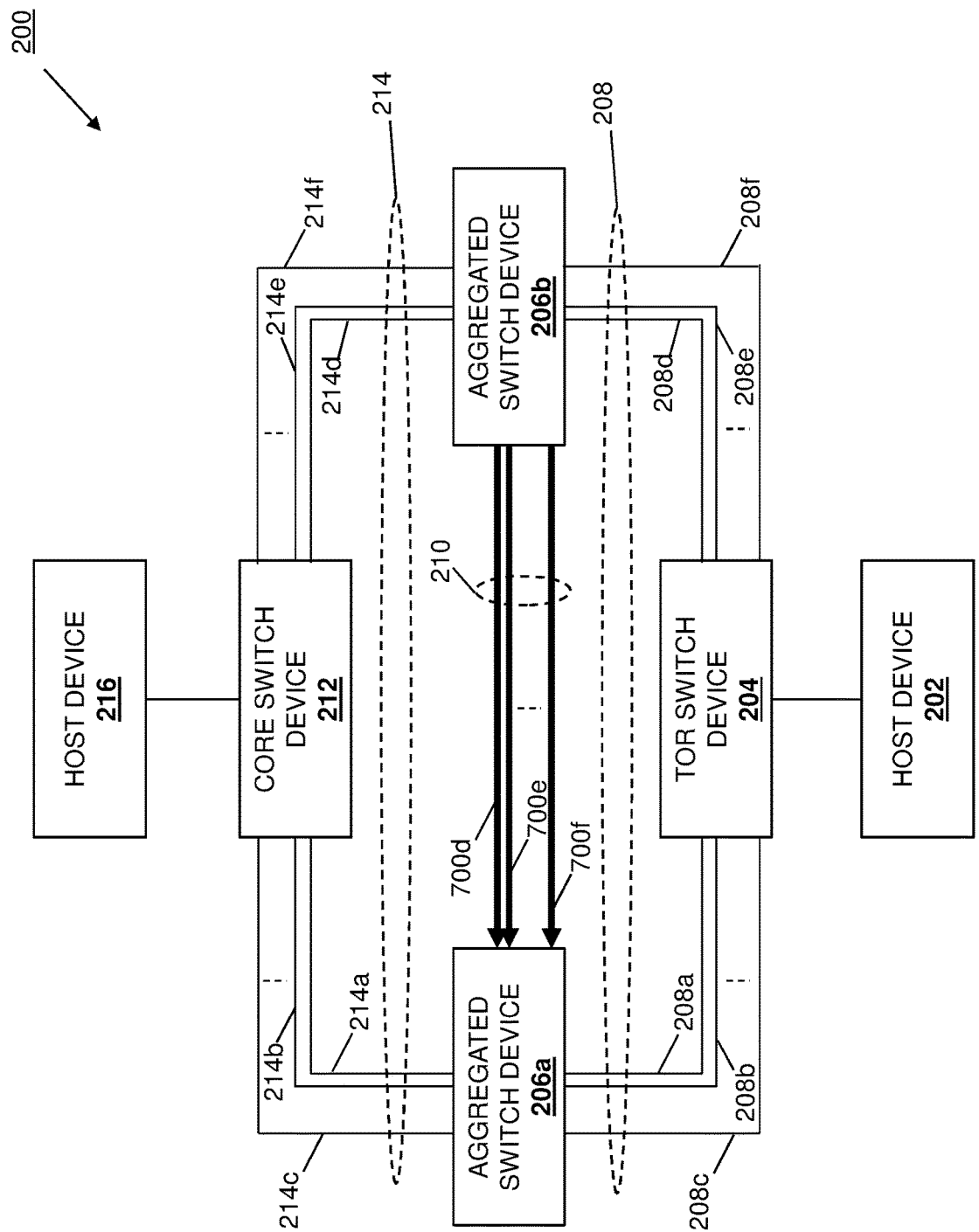
FIG. 7B is a schematic view illustrating an embodiment of the control packet transmission system of FIG. 2 operating during the method of FIG. 4.

The method 600 then proceeds to block 604 where the secondary aggregated switch device transmits to the primary aggregated switch device a copy of control packets received from the TOR switch device. With reference to FIG. 7B, in an embodiment of block 604, the control packet transmission engine 304 in the aggregated switch device 206b/300 operating as the secondary aggregated switch device may operate to transmit copies of the control data in the control packets 700*d*, 700*e*, and up to 700*f* via the ICL 210 to the aggregated switch device 206*a*. As such, the copies of the control data in the control packets 700*d*, 700*e*, and up to 700*f* transmitted via the ICL 210 to the aggregated switch device 206*a* may be provided by LACP PDU's.

The method 600 then proceeds to block 606 where the primary aggregated switch device generates control packet hash values using each control packet, and generates a consolidated hash value using the control packet hash values. As will be appreciated by one of skill in the art in possession of the present disclosure, control data/control packets exchanged in the method 600 during the third control data exchange time period is "new" control data/control packets that either has not been previously transmitted by the TOR switch device 204 to the aggregated switch devices 206*a* and 206*b*, or that includes at least one modification relative to the control data/control packets that was previously transmitted by the TOR switch device 204 to the aggregated switch devices 206*a* and 206*b*. As such, in an embodiment of block 606, the control packet transmission engine 304 in the aggregated switch device 206*a*/300 operating as the primary aggregated switch device may operate to generate respective hash values for each of the control packets 700*a*-700*f* transmitted by the TOR switch device 204 during the third control data exchange time period by performing a respective hashing operation (e.g., a SHA-256 hashing operation in the example above) on each of the control packets 700*a*-700*f* (e.g., the control data in each of those control packets) to generate respective hash values that it may store in its control packet transmission database 306.

Figure 7C:
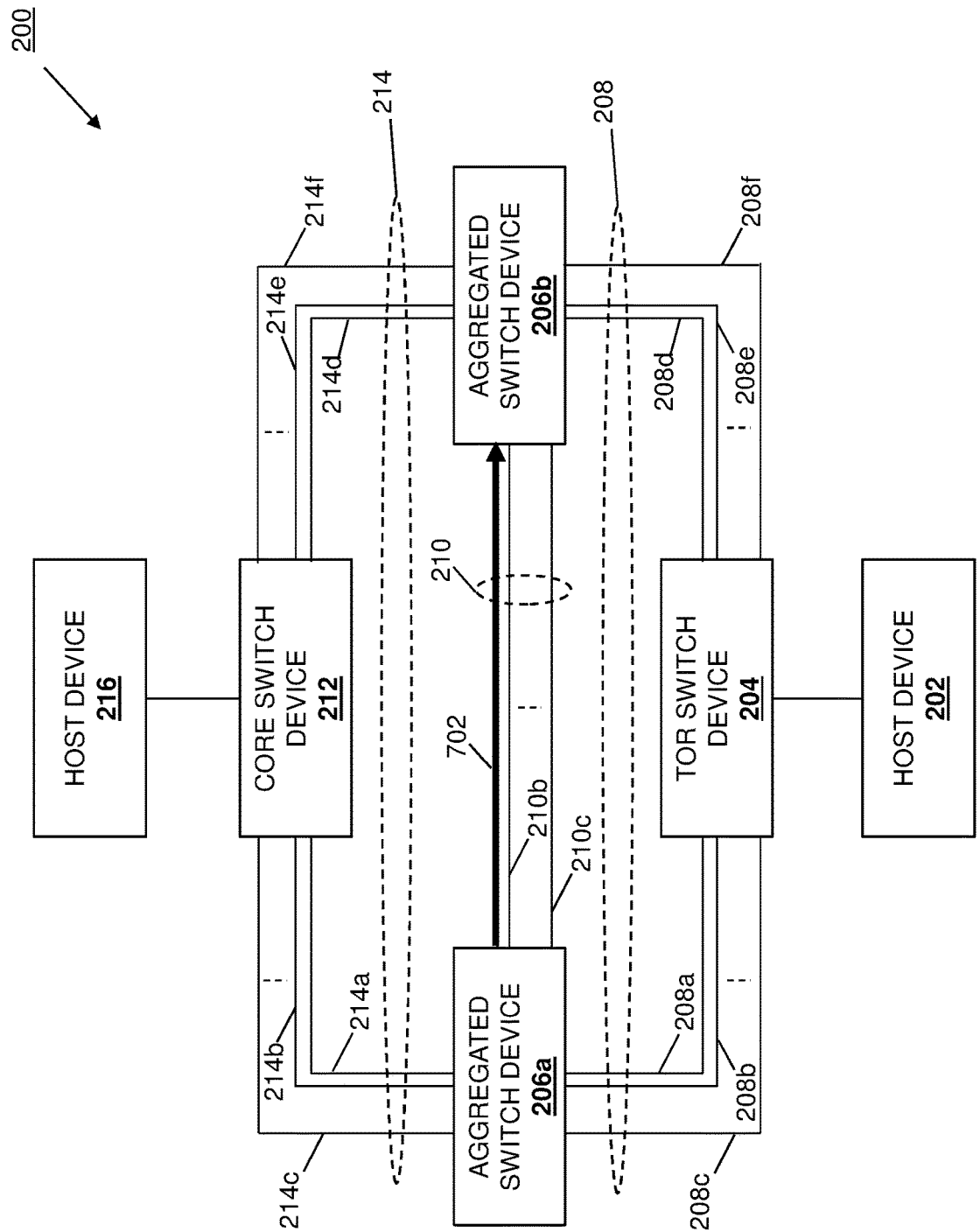
FIG. 7C is a schematic view illustrating an embodiment of the control packet transmission system of FIG. 2 operating during the method of FIG. 4.

The control packet transmission engine 304 in the aggregated switch device 206*a*/300 operating as the primary aggregated switch device may then generate a consolidated hash value for each of the control packets 700*a*-700*f* transmitted by the TOR switch device 204 during the third control data exchange time period by performing a hashing operation (e.g., a SHA-256 hashing operation in the example above) on each of the respective hash values generated for those control packets 700*a*-700*f*, and may then store that consolidated hash value in its control data transmission database 306. However, while a specific example of generating a consolidated hash value has been described, one of skill in the art in possession of the present disclosure will recognize that the consolidated hash values of the present disclosure may be generated in a variety of manners that will fall within the scope of the present disclosure as well. With reference to the embodiment illustrated in FIG. 7C, in some examples the control packet transmission engine 304 in the aggregated switch device 206*a*/300 may transmit a consolidated hash packet 702 generated at block 606 via its communication system 308, through the ICL 210, and to the aggregated switch device 206*b*. As such, the control packet transmission engine 304 in the aggregated switch device 206*b*/300 may receive the consolidated hash packet 702 generated at block 606 by the aggregated switch device 206*a* via its communication system 308, and store that consolidated hash packet 702 in its control transmission database 306.

The method 600 then proceeds to block 608 where the TOR switch device generates the control packet hash values using each control packet, and generates the consolidated hash value using the control packet hash values. As discussed above, control data/control packets exchanged in the method 600 during the third control data exchange time period is "new" control data/control packets that either has not been previously transmitted by the TOR switch device 204 to the aggregated switch devices 206*a* and 206*b*, or that includes at least one modification relative to the control data/control packets that was previously transmitted by the TOR switch device 204 to the aggregated switch devices 206*a* and 206*b*. As such, in an embodiment of block 608, the control packet transmission engine 304 in the TOR switch device 204/300 may operate to generate respective hash values for each of the control packets 700*a*-700*f* transmitted to the TOR switch device 204 during the third control data exchange time period by performing a respective hashing operation (e.g., a SHA-256 hashing operation in the example above) on each of the control packets 700*a*-700*f* (e.g., the control data in each of those control packets) to generate respective hash values that it may store in its control packet transmission database 306.

The control packet transmission engine 304 in the TOR switch device 204 may then generate a consolidated hash value for each of the control packets 700*a*-700*f* received from the aggregated switch devices 206*a* and 206*b* during the third control data exchange time period by performing a hashing operation (e.g., a SHA-256 hashing operation in the example above) on each of the respective hash values generated for those control packets 700*a*-700*f*, and may then store that consolidated hash value in its control data transmission database 306. However, while a specific example of generating a consolidated hash value has been described, one of skill in the art in possession of the present disclosure will recognize that the consolidated hash values of the present disclosure may be generated in a variety of manners that will fall within the scope of the present disclosure as well. As will be appreciated by one of skill in the art in possession of the present disclosure, the TOR switch device 204 and the aggregated switch device 206*a* operating as the primary aggregated switch device will generate the same consolidated hash value at blocks 606 and 608, as each is performing the same hashing operation (e.g., the SHA-256 hashing operating in the examples above) on the same control data/control packets 700*a*-700*e*.

The method 600 then proceeds to decision block 610 where it is determined whether the control data to-be transmitted during a fourth control data exchange time period is the same as control data that was transmitted during the third control data exchange time period. In an embodiment, at decision block 610, the control packet transmission engine 304 in the TOR switch device 204 may operate to determine whether control data that is scheduled to be exchanged during a fourth control data exchange time period (that is subsequent to the third control data exchanged time period) is the same as the control data that was exchanged during the third control data exchange time period. As such, in some embodiments of decision block 610, the control packet transmission engines 304 in the TOR switch device 204 may determine whether any modifications have occurred to the TOR switch device 204 that would result in the transmission of control data/control packets during the fourth control data exchange time period that is the same as the control data/control packets 700*a*-700*e* that were previously transmitted during the third control data exchange time period. While a particular technique for determining whether control data to-be transmitted during a fourth control data exchange time period is the same as control data that was transmitted during a third control data exchange time period has been described, one of skill in the art in possession of the present disclosure will appreciate that other techniques may be utilized that will fall within the scope of the present disclosure as well.

If, at decision block 610, it is determined that the control data to-be transmitted during the fourth control data exchange time period is not the same as control data that was transmitted during the third control data exchange time period, the method 600 returns to block 602, with the third control data exchange time period resetting. In an embodiment, at block 610, the control packet transmission engine 304 in the TOR switch device 204 may operate at decision block 610 to determine that the control data/control packets scheduled for transmission during the fourth control data exchange time period is not the same as the control data/control packets 700a-700e that were transmitted during the third control data exchange time period and, in response, the method 600 may return to the block 602 and the third control data exchange time period may be reset such that the control data/control packets that are not the same as the control data/control packets 700a-700e that were transmitted during the third control data exchange time period in the above iteration of the method 600 will be considered to be generated and transmitted during a "new" third control data exchange time period in the subsequent iteration of the method 400. As such, each time control data to-be transmitted during a fourth control data exchange time period is not the same as control data that was transmitted during a third control data exchange time period, the method 600 may loop back through blocks 602-608 to operate as discussed above such that the aggregated switch device 206a and the TOR switch device 204 generate a "new" consolidated hash value for that control data/those control packets.

Figure 7D:
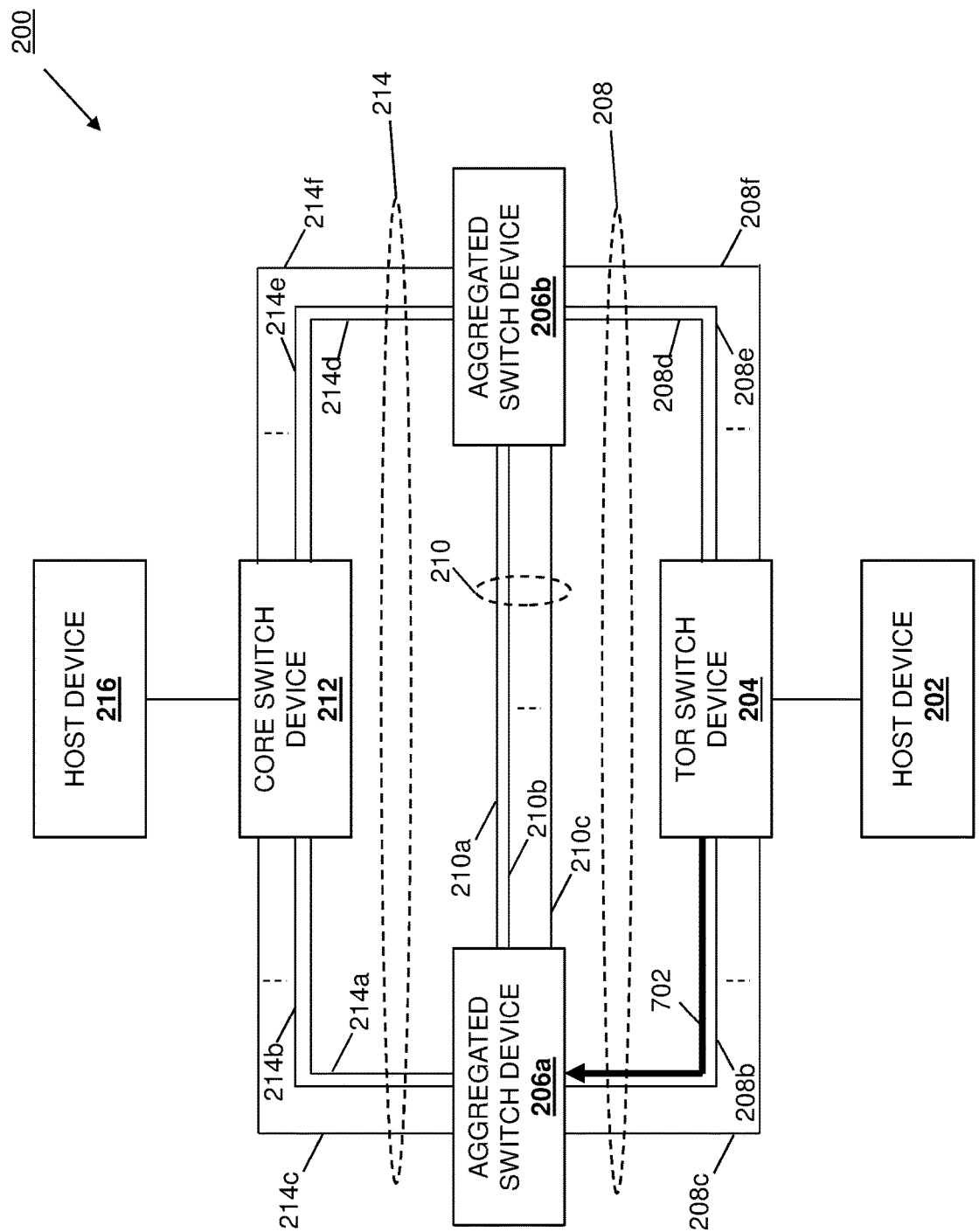
FIG. 7D is a schematic view illustrating an embodiment of the control packet transmission system of FIG. 2 operating during the method of FIG. 4.

If at decision block 610, it is determined that control data to-be transmitted during the fourth control data exchange time period is the same as control data that was transmitted during the third control data exchange time period, the method 600 proceeds to block 612 where the TOR switch device transmits the consolidated hash value to the primary aggregated switch device. In an embodiment, at block 612, the control packet transmission engine 304 in the TOR switch device 204 may operate at decision block 610 to determine that the control data/control packets scheduled for transmission during the fourth control data exchange time period is the same as the control data/control packets 700a-700e that were transmitted during the third control data exchange time period and, in response, may operate to transmit the consolidated hash value that it generated at block 606 to the aggregated switch device 206a operating as the primary aggregated switch device. For example, with reference to FIG. 7D, the control packet transmission engine 304 in the TOR switch device 204 is illustrated as transmitting the consolidated hash packet 702 it generated at block 606 via its communication system 308 and through the link 208a to the aggregated switch device 206a. As will be appreciated by one of skill in the art in possession of the present disclosure, the transmission of the consolidated hash packet 702 from the TOR switch device 206a to the aggregated switch device 206a via the single link 208a is performed in place of the generation and transmission of the control packets that were scheduled for transmission during the fourth control data exchange time period, thus saving processing, buffer, and queue resources in the TOR switch device 204 that would have been necessary to generate and transmit those control packets, as well as bandwidth resources between the TOR switch device 204 and the aggregated switch devices 206a and 206b (e.g., the links 208b and up to 208c, 208d, 208e, and up to 208f) that would have been necessary to transmit those control packets.

The method 600 then proceeds to block 614 where the primary aggregated switch device uses the consolidated hash value to confirm no changes in control data during the fourth control data exchange time period. In an embodiment, at block 614, the control packet transmission engine 304 in the aggregated switch device 206a/300 operating as the primary aggregated switch device may receive the consolidated hash packet 702 transmitted by the TOR switch device 204 at block 612, and may determine that no changes in control data have occurred during the fourth control data exchange time period due to the consolidated hash value received from the TOR switch device 204 at block 614 being the same as the consolidated hash value it calculated at block 608. The method 600 then returns to decision block 610, with the fourth control data exchange time period becoming the third control data exchange time period. As such, as long as the control data being exchanged in a subsequent control data exchange time period does not change, the method 600 may operate to loop through blocks 610-614 such that the TOR switch device 204 determines that lack of change, the TOR switch device 204 transmits the consolidated hash value to the aggregated switch device 206a, and the aggregated switch device 206a uses the consolidated hash value to confirm that no change has occurred during that subsequent control data exchange time period.

Thus, systems and methods have been described that provide for the generation of a consolidated hash value, using hash values generated for all of the control packets transmitted between aggregated switch devices and a connected switch device during any initial control data exchange time period, by both a primary aggregated switch device and its connected switch device. Subsequently, when the aggregated switch devices or the connected switch device are scheduled to transmit control packets between them during a subsequent control data exchange time period, they may determine that the control data in those control packets is the same as that which was transmitted during the initial control data exchange time period and, in response, may transmit the consolidated hash value in place of any control packets that are scheduled for transmission during that subsequent control data exchange time period. Upon receiving the consolidated hash value during the second control data exchange time period, the primary aggregated switch device or the connected switch device may identify that the control data scheduled for transmission has not changed (e.g., based on receiving the consolidated hash value that was also previously generated by that device during the first control data exchange time period.) As such, control packet processing, buffer use, queue use, and/or transmission bandwidth use is reduced when duplicative control data is transmitted between the aggregated switch devices and the connected switch device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A control packet transmission system, comprising:
a first switch device that includes a first chassis and that is configured, during a first control data exchange time period, to:
generate first switch device control packets; and
transmit the first switch device control packets to a second switch device that includes a second chassis and that is coupled to the first switch device; and
a third switch device that includes a third chassis and that is coupled to the first switch device and the second switch device, wherein the third switch device is configured, during the first control data exchange time period, to:
generate third switch device control packets;
transmit the third switch device control packets to the second switch device; and
transmit a copy of the third switch device control packets to the first switch device,
wherein the first switch is configured to:
perform a respective first hashing operation on each of the first switch device control packets and the third switch device control packets to generate respective first hash values;
perform a second hashing operation on all of the respective first hash values to generate a first consolidated hash value; and
determine, during a second control data exchange time period that is subsequent to the first control data exchange time period, that control data exchanged during the second control data exchange time period will be the same as control data exchanged during the first control data exchange time period and, in response, transmit the first consolidated hash value to the second switch device in place of any control packets transmitted to the second switch device by the first switch device and the third switch device.

2. The system of claim 1, wherein the first switch device control packets and the second switch device control packets are Link Aggregation Control Protocol (LACP) Protocol Data Units (PDUs).

3. The system of claim 1, wherein the first switch is configured to:
transmit the first consolidated hash value to the third switch device.

4. The system of claim 1, wherein the first switch is configured to:
determine, during a third control data exchange time period that is subsequent to the second control data exchange time period, that control data exchanged during the third control data exchange time period will be the same as control data exchanged during the first control data exchange time period and the second control data exchange time period and, in response, transmit the first consolidated hash value to the second switch device in place of any control packets transmitted to the second switch device by the first switch device and the third switch device.

5. The system of claim 1, wherein the first switch device is configured, during a third time period that is subsequent to the first time period, to:
receive, from the second switch device, a first subset of second switch device control packets;
receive, from the third switch device, a second subset of second switch device control packets that were transmitted by the second switch device to the third switch device;
perform a respective third hashing operation on each of the first subset of second switch device control packets and the second subset of second switch device control packets to generate respective second hash values; and
perform a fourth hashing operation on all of the respective second hash values to generate a second consolidated hash value.

6. The system of claim 5, wherein the first switch device is configured, during a fourth time period that is subsequent to the third time period, to:
receive, from the second switch device, the second consolidated hash value in place of any control packets transmitted by the second switch device to the first switch device and the third switch device; and
determine that the control data transmitted by the second switch device to the first switch device and the third switch device during the fourth time period is the same as the control data transmitted by the second switch device to the first switch device and the third switch device during the third time period.

7. An Information Handling System (IHS), comprising:
a processing system; and
a memory system that is coupled to the processing system and that includes instructions that, when executed by the processing system, cause the processing system to provide a control packet transmission engine that is configured, during a first control data exchange time period, to:
generate first control packets;
transmit the first control packets to a first switch device;
receive, from a second switch device, a copy of second control packets that were transmitted by the second switch device to the first switch device;
perform a respective first hashing operation on each of the first control packets and the second control packets to generate respective first hash values; and
perform a second hashing operation on all of the respective first hash values to generate a first consolidated hash value, and
wherein the control packet transmission engine is configured, during a second control data exchange time period that is subsequent to the first control data exchange time period, to:
determine that control data exchanged during the second control data exchange time period will be the same as control data exchanged during the first control data exchange time period and, in response, transmit the first consolidated hash value to the first switch device in place of any control packets transmitted to the first switch device by the control packet transmission engine and the second switch device.

8. The IHS of claim 7, wherein the first control packets and the second control packets are Link Aggregation Control Protocol (LACP) Protocol Data Units (PDUs).

9. The IHS of claim 7, wherein the control packet transmission engine is configured to:
transmit the first consolidated hash value to the second switch device.

10. The IHS of claim 7, wherein the control packet transmission engine is configured to:
determine, during a third control data exchange time period that is subsequent to the second control data exchange time period, that control data exchanged during the third control data exchange time period will be the same as control data exchanged during the first control data exchange time period and the second control data exchange time period and, in response, transmit the first consolidated hash value to the first switch device in place of any control packets transmitted to the first switch device by the control packet transmission engine and the second switch device.

11. The IHS of claim 7, wherein the control packet transmission engine is configured, during a third time period that is subsequent to the first time period, to:
receive, from the first switch device, a first subset of third control packets;

receive, from the second switch device, a second subset of third switch device control packets that were transmitted by the first switch device to the second switch device;

perform a respective third hashing operation on each of the first subset of third control packets and the second subset of third control packets to generate respective second hash values; and perform a fourth hashing operation on all of the respective second hash values to generate a second consolidated hash value.

12. The IHS of claim 11, wherein the control packet transmission engine is configured, during a fourth time period that is subsequent to the third time period, to:

receive, from the first switch device, the second consolidated hash value in place of any control packets transmitted by the first switch device to the control packet transmission engine and the second switch device; and determine that the control data transmitted by the first switch device to the control packet transmission engine and the second switch device during the fourth time period is the same as the control data transmitted by the first switch device to the control packet transmission engine and the second switch device during the third time period.

13. The IHS of claim 7, wherein the first switch device is a Top Of Rack (TOR) switch device, and wherein the second switch device is an aggregated switch device that operates to provide an aggregated link to the TOR switch device with the control packet transmission engine.

14. A method for transmitting control packets, comprising:

generating, by a first switch device during a first control data exchange time period, first switch device control packets;

transmitting, by the first switch device to a second switch device during the first control data exchange time period, the first switch device control packets;

receiving, by the first switch device during the first control data exchange time period from a third switch device, a copy of third switch device control packets that were transmitted by the third switch device to the second switch device;

performing, by the first switch device, a respective first hashing operation on each of the first switch device control packets and the third switch device control packets to generate respective first hash values;

performing, by the first switch device, a second hashing operation on all of the respective first hash values to generate a first consolidated hash value; and determining, by the first switch device during a second control data exchange time period that is subsequent to the first control data exchange time period, that control data exchanged during the second control data exchange time period will be the same as control data exchanged during the first control data exchange time period and, in response, transmitting the first consolidated hash value to the second switch device in place of any control packets transmitted to the second switch device by the first switch device and the third switch device.

15. The method of claim 14, wherein the first switch device control packets and the third switch device control packets are Link Aggregation Control Protocol (LACP) Protocol Data Units (PDUs).

16. The method of claim 14, further comprising:

transmitting, by the first switch device, the first consolidated hash value to the third switch device.

17. The method of claim 14, further comprising:

determining, by the first switch device during a third control data exchange time period that is subsequent to the second control data exchange time period, that control data exchanged during the third control data exchange time period will be the same as control data exchanged during the first control data exchange time period and the second control data exchange time period and, in response, transmit the first consolidated hash value to the second switch device in place of any control packets transmitted to the second switch device by the first switch device and the third switch device.

18. The method of claim 14, further comprising:

receiving, by the first switch device from the second switch device during a third control data exchange time period that is subsequent to the first control data exchange time period, a first subset of second switch device control packets;

receiving, by the first switch device from the third switch device during the third control data exchange time period, a second subset of second switch device control packets that were transmitted by the second switch device to the third switch device;

performing, by the first switch device, a respective third hashing operation on each of the first subset of second switch device control packets and the second subset of second switch device control packets to generate respective second hash values; and performing, by the first switch device, a fourth hashing operation on all of the respective second hash values to generate a second consolidated hash value.

19. The method of claim 18, further comprising:

receiving, by the first switch device from the second switch device during a fourth control data exchange time period that is subsequent to the third control data exchange time period, the second consolidated hash value in place of any control packets transmitted by the second switch device to the first switch device and the third switch device; and determining, by the first switch device during the fourth control data exchange time period, that the control data transmitted by the second switch device to the first switch device and the third switch device during the fourth control data exchange time period is the same as the control data transmitted by the second switch device to the first switch device and the third switch device during the third time period.

20. The method of claim 14, wherein the second switch device is a Top Of Rack (TOR) switch device, and wherein the first switch device and the third switch device are aggregated switch devices that operate to provide an aggregated link to the TOR switch device.

* * * * *